United States Patent
Ponnappa et al.

(10) Patent No.: US 12,492,310 B2
(45) Date of Patent: Dec. 9, 2025

(54) ANTI-CORROSION CONVERSION COATING COMPOSITIONS AND METHODS FOR THE SAME

(71) Applicant: The Boeing Company, Chicago, IL (US)

(72) Inventors: Charitha Beliyandra Ponnappa, Karnataka (IN); Kamaraj Kandhasamy, Karnataka (IN)

(73) Assignee: THE BOEING COMPANY, Arlington, VA (US)

( * ) Notice: Subject to any disclaimer, the term of this patent is extended or adjusted under 35 U.S.C. 154(b) by 799 days.

(21) Appl. No.: 17/662,959

(22) Filed: May 11, 2022

(65) Prior Publication Data

US 2023/0365813 A1    Nov. 16, 2023

(51) Int. Cl.
| | |
|---|---|
| C09D 5/08 | (2006.01) |
| B05D 7/00 | (2006.01) |
| C09D 7/61 | (2018.01) |
| C09D 103/02 | (2006.01) |
| C08K 3/22 | (2006.01) |

(52) U.S. Cl.
CPC .............. C09D 5/084 (2013.01); B05D 7/54 (2013.01); C09D 7/61 (2018.01); C09D 103/02 (2013.01); *C08K 2003/2213* (2013.01)

(58) Field of Classification Search
None
See application file for complete search history.

(56) References Cited

U.S. PATENT DOCUMENTS

| | | |
|---|---|---|
| 6,190,780 B1 | 2/2001 | Shoji et al. |
| 2003/0143420 A1 | 7/2003 | Wojcik |
| 2005/0103229 A1 | 5/2005 | Tanaka et al. |

FOREIGN PATENT DOCUMENTS

| | | | |
|---|---|---|---|
| CN | 104293195 A | * | 1/2015 |
| CN | 104844815 A | | 8/2015 |
| CN | 105331265 A | * | 2/2016 |
| CN | 108361449 A | * | 8/2018 |
| CN | 111041465 A | | 4/2020 |

(Continued)

OTHER PUBLICATIONS

Extended European Search Report issued Sep. 18, 2023 in corresponding European Application No. 231581139.8, 6 pages.

(Continued)

*Primary Examiner* — Tae H Yoon
(74) *Attorney, Agent, or Firm* — MH2 Technology Law Group LLP

(57) ABSTRACT

Anti-corrosive conversion coating compositions are disclosed. The anti-corrosive conversion coating compositions include a biopolymer and a rare earth element compound. Implementations of the anti-corrosive conversion coating composition can include where the biopolymer includes chitosan, starch, inulin, dextran, pullulan, or a combination thereof. The rare earth element compound may include one or more of the lanthanide series of elements, scandium, yttrium, or a combination thereof. The rare earth element compound may include a hydroxide of a rare earth element, an oxide of a rare earth element, or a combination thereof. Coated articles and methods for applying the anti-corrosive conversion coating compositions are also disclosed.

20 Claims, 3 Drawing Sheets

(56) References Cited

FOREIGN PATENT DOCUMENTS

JP          2004010784 A  *  1/2004
WO     WO 2011099460 A1 *  8/2011

OTHER PUBLICATIONS

Atay et al., "Investigations of Self-Healing Property of Chitosan-Reinforced Epoxy Dye Composite Coatings," Hindawi Publishing Corporation, Journal of Materials, vol. 2013, article ID 613717, 7 pages.
Charitha et al., "Enhancement of Surface Coating Characteristics of Epoxy Resin by Dextran: An Electrochemical Approach, Industrial & Engineering Chemistry Research," published Jan. 10, 2017, 11 pages.
Unknown (Author), Everestarch Evercoat-Modified Starch for Surphase Coating product brochure, downloaded on May 2, 2022 from https://evereststarch.com/evercoat-modified-starch-for-surphase-coating/, 3 pages.
Galvao et al., "Chapter 16—Anticorrosion thin film smart coatings for aluminum alloys," Advances in Smart Coatings and Thin Films for Future Industrial and Biomedical Engineering Application, 2020, 26 pages.
Morozov et al., "Epoxy coatings modified with a new cerium phosphate inhibitor for smart corrosion protection of steel," Corrosion Science 159 (2019) 108128, 12 pages.
Song et al., "Biopolymer-Based Coatings: Promising Strategies to Improve the Biocompatibility and Functionality of Materials Used in Biomedical Engineering," Advanced Materials Interfaces 2020, 7, 2000850, 19 pages.

* cited by examiner

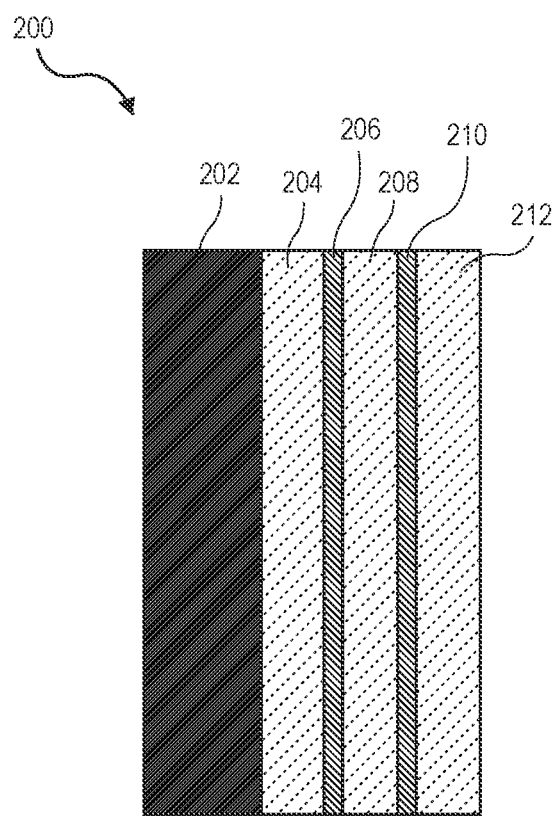
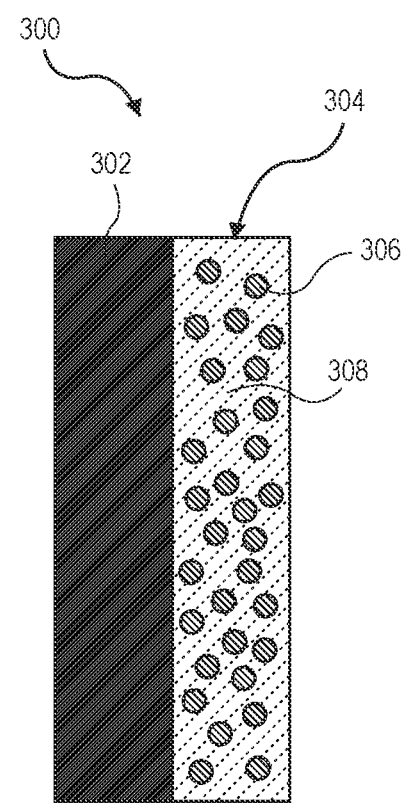
FIG. 2
FIG. 3

ANTI-CORROSION CONVERSION COATING COMPOSITIONS AND METHODS FOR THE SAME

TECHNICAL FIELD

The present disclosure generally relates to the field of conversion coating compositions having anti-corrosion properties. More particularly, the present disclosure relates to compositions for anti-corrosion coatings including biopolymers and rare earth elements and methods for making the same.

BACKGROUND

Corrosion prevention is an important design consideration in metallic components, particularly within vehicles such as aerospace or marine vessels such as boats, ships, or submarines, military aircrafts, commercial aircrafts, or other marine atmosphere applications. One method for the prevention of metal corrosion is with the use of conversion coatings. Conversion coatings form a complex chromate film with metal substrates based on a chemical reaction between substrate metal and chromates. Conversion coatings containing hexavalent chrome are commonly used corrosion resistant pigments that are added to such conversion coatings. However, the deceased usage of these materials to meet environmental, health and safety regulations, and to limit their future introduction into the environment is of interest.

It is of further interest that anti-corrosive conversion coatings are long lasting when subjected to various use environmental conditions. Anti-corrosive conversion coatings having a self-healing effect, where the primary functionality of such a coating is preserved as the coating wears or endures various use environments, would benefit from such a protective coating system or coating matrix design. Environmentally friendly, anti-corrosive conversion coatings could find wide utility in various applications, such as ships, boats, sub-marines, military aircrafts and commercial aircrafts for corrosion prevention including that operate in marine atmospheres. Therefore, there is a need for environmentally friendly, self-healing, biodegradable surface coatings having improved anti-corrosive properties and the methods to fabricate and apply such anti-corrosive conversion coatings.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

The present disclosure provides an anti-corrosive conversion coating composition. The anti-corrosive conversion coating composition also includes a biopolymer, and a rare earth element compound. Implementations of the anti-corrosive conversion coating composition can include where the biopolymer includes chitosan, starch, inulin, dextran, pullulan, or a combination thereof. The biopolymer may include starch. The rare earth element compound may include one or more of the lanthanide series of elements. The rare earth element compound may include scandium, yttrium, or a combination thereof. The rare earth element compound may include a hydroxide of a rare earth element, an oxide of a rare earth element, or a combination thereof. The rare earth element compound may include cerium. The rare earth element compound may include cerium oxide. The rare earth element compound may include cerium hydroxide. The anti-corrosive conversion coating composition may include one or more mineral fillers, one or more reactive silanes, or a combination thereof.

The present disclosure also provides a coated article. The coated article includes a substrate, a first coating layer that may include a rare earth element compound disposed upon at least a portion of the substrate. The coated article may also include a second coating layer that may include a biopolymer disposed upon at least a portion of the first coating layer. Implementations of the coated article may include a third coating layer that may include a rare earth element compound disposed upon at least a portion of the second coating layer and a fourth coating layer which may include a biopolymer disposed upon at least a portion of the third coating layer. The rare earth element compound in the first coating layer and the rare earth element compound in the third coating layer may be different. The biopolymer in the second coating layer and the biopolymer in the fourth coating layer may be different. The biopolymer may include chitosan, starch, inulin, dextran, pullulan, or a combination thereof. The rare earth element compound may include one or more of the lanthanide series of elements. The rare earth element compound may include cerium oxide and the biopolymer may include starch.

A method for applying an anti-corrosive conversion coating composition is also disclosed. The method may include preparing a substrate. The method for applying an anti-corrosive conversion coating composition also includes applying a coating that includes a rare earth element compound. The method for applying an anti-corrosive conversion coating composition also includes applying a coating that includes a biopolymer.

Implementations of the method for applying an anti-corrosive conversion coating composition may include applying the coating having a biopolymer after applying the coating having the rare earth element compound. In certain aspects, the substrate is aluminum, the biopolymer may include chitosan, starch, inulin, dextran, pullulan, or a combination thereof, and the rare earth element compound may include cerium.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 2 illustrates a schematic view of a multilayered biopolymer and rare earth element coating on a substrate, in accordance with the present disclosure.

FIG. 3 illustrates a schematic view of a biopolymer-doped rare earth element coating on a substrate, in accordance with the present disclosure.

Figure 1:
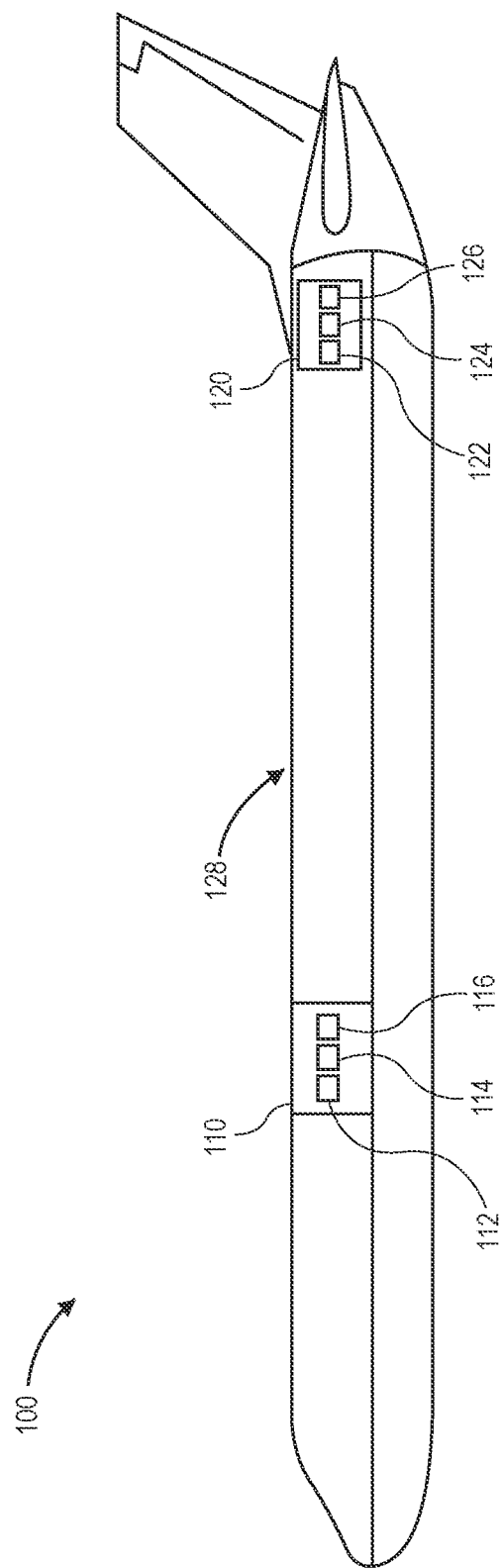
FIG. 1 illustrates a schematic view of a vehicle, in accordance with the present disclosure.

It should be noted that some details of the figures have been simplified and are drawn to facilitate understanding of the present teachings rather than to maintain strict structural accuracy, detail, and scale.

DETAILED DESCRIPTION

Marine environments, in part due to high salinity, can present an extremely aggressive corrosive setting for metals and alloys. The mechanism of corrosion in seawater, and in other aggressive environments, is electrochemical in nature. Protective coatings are one of the primary corrosion prevention methods which act as a barrier between a material and its service environment. Examples of the present disclosure include the development of environmentally friendly coating systems for marine applications and any other such applications requiring primarily corrosion protection. Examples include multifunctional, smart self-healing coatings containing biopolymers, rare earth element compounds, or both.

Conversion coatings including chromates are widely used for corrosion protection in aerospace industry and in various industrial sectors. A typical conversion coating forms a complex chromate film with the metal due to a chemical reaction between a substrate metal and chromates within the conversion coating composition. Chromium in hexavalent form is usually recommended for such coating systems based on their corrosion resistant properties. However, hexavalent chromes are highly toxic, carcinogenic in nature, and cause negative impact on environment and health. Thus, the use of chromate-based coatings are restricted by environmental regulations such as Registration, Evaluation, Authorisation and Restriction of Chemicals (REACH), the Environmental Protection Agency (EPA), Toxic Substances Control Act (TSCA), and the like. While limited usage of hexavalent chrome coatings for aerospace applications and some hexavalent chrome (Cr6+) additives for aerospace paints is allowed, not all regulatory agencies, the European Commission, for example, have approved such uses.

Due to negative environmental impacts of chromate-based coatings, alternatives to hexavalent chrome-based conversion coatings are desirable. Replacement of hexavalent chrome in conversion coatings may improve environmental safety and reduce costs by comparison. While the use of transition metals, organic and inorganic inhibitors, and the like, have been explored to find improved alternatives for chrome in conversion anti-corrosion coatings, there has been a lack of viable substitutes that meet industrial coating requirements, and these coatings have not been proven to meet the stringent requirements of the aircraft industry. Exemplary conversion coatings of the present disclosure include replacements for hexa-chrome include rare earth elements (REE). Rare earth elements possess and impart high corrosion resistant and self-healing properties to conversion coatings of the present disclosure. One potential disadvantage of anti-corrosive conversion coatings as a base coat can include the appearance of mud cracks in the coating surface morphology after drying, which in turn may propagate the corrosion process for coated surfaces. In accordance with the present disclosure, the mixing of rare earth elements with biopolymers, or alternating coatings thereof, can synergistically provide improved corrosion resistance for a variety of surfaces. Conversion coatings of the present disclosure based on biopolymers and rare earth elements (REE) provide a suitable alternative to chrome-based conversion coatings. Biopolymers such as starch, inulin, pullulan, cellulose, chitin, dextran, pectin, chitosan, and the like may be used in conversion coatings of the present disclosure. Furthermore, such biopolymers can provide self-repairing properties and are considered as eco-friendly corrosion inhibitors with lower cost in comparison to other known conversion coatings. Biopolymers have been used as coating materials due to their strong adhesion with substrate materials and for barrier properties. Conversion coatings of the present disclosure provide a system and process to use rare earth elements as inhibitive pigments or coating components to improve the corrosion resistance of the conversion coatings. Rare earth elements such as lanthanum, cerium, praseodymium, and samarium, among others, can act as an effective corrosion inhibitor in oxide and hydroxide forms. These approaches and coatings of the present disclosure provide environmentally friendly coatings for protection, for marine applications, and other extreme environment applications. Exemplary examples of anti-corrosive conversion coating formulations of the present disclosure include several key features. By nature of the design and inclusion of both rare earth element compounds, biopolymers, or both, smart, self-healing activity is embedded in the coating framework or matrix, and thus the self-healing activity is retained throughout the coating matrix, even as wear occurs at the coating surface, maintaining performance of the coating as it is homogeneously distributed in the coating matrix. Alternatively, if rare earth element compound surface coatings are alternated with biopolymers, the self-healing nature of either coating layer is also provided. Disclosed herein are coating systems and methods having the functionalities of anti-corrosion and self-healing. Exemplary anti-corrosive conversion coating formulations as described herein may be applied to sea-faring or marine vessels such as ships, boats, sub-marines, or alternatively military aircrafts, commercial aircrafts, or amphibious or land vehicles for corrosion prevention inclusive of any vehicle that may operate in a marine atmosphere.

Exemplary examples of the present disclosure include formulations of an anti-corrosive conversion coating composition including a biopolymer and a rare earth element compound. The biopolymer can include chitosan, starch, inulin, dextran, pullulan, or a combination thereof. The rare earth element compound can include but is not limited to one or more of the lanthanide series of elements, scandium, yttrium, or a combination thereof. In exemplary examples of anti-corrosive conversion coating compositions of the present disclosure the rare earth element compound can include a hydroxide of a rare earth element, an oxide of a rare earth element, or a combination thereof, and may include cerium, cerium oxide, or cerium hydroxide. One or more fillers incorporated into the anti-corrosive conversion coating composition can be selected from a group including titanium dioxide, talc, mica, silicon dioxide, and aluminum stearate. The one or more fillers can be present in the anti-corrosive conversion coating from about 1% wt to about 10% wt, from about 1% wt to about 5% wt, or from about 3% wt to about 7% wt, based on a total weight of the anti-corrosive conversion coating composition.

Without wishing to be bound by any particular theory, it is believed that the biopolymers disclosed herein, such as, but not limited to starch, inulin, pullulan, dextran, and the like, contain electron rich heteroatoms such as oxygen, nitrogen, sulfur, etc., and participate in the formation of coordination bonding with rare earth elements (REE). The combination of biopolymers and rare earth ions can provide improved corrosion resistant coatings and a suitable alternative for chrome-based conversion coatings. These coatings can be provided via several methods in accordance with the present disclosure, such as applying multiple layer or bi-layered coatings while alternative coating layers of rare earth element ions and biopolymers, applying single layer, rare earth element containing biopolymer coatings. This may involve the formation of a bond onto a substrate through chemisorption. The biopolymer and rare earth element ions donate an electron to the vacant p-orbitals of aluminum or other metals to form a strong bond, thus providing surface adhesion of the coating to the substrate. The anti-corrosion conversion coatings utilizing a combination of biopolymer and rare earth metal complexes provide a replacement of hexavalent chrome in such conversion coatings for marine and aerospace applications, among others. Such an approach can lead to cost-effective, environmentally friendly, self-healing, and corrosion resistant conversion coatings.

In some examples, a self-healing anti-corrosive conversion coating composition or formulation can be applied to protect a substrate and other layers or portions of a vehicle 100 from the environment. FIG. 1 illustrates a schematic view of a vehicle 100, according to an implementation. As shown, the vehicle 100 may include an airplane. The vehicle 100 may also or instead include other types of aircrafts such as helicopters, unmanned aerial vehicles (UAVs), spacecrafts, or the like. In other implementations, the vehicle 100 may be or include a car, a boat, a train, or the like. In yet other implementations, the system and method described below may not be implemented in a vehicle, and rather may be implemented in a building.

The vehicle 100 may include one or more lavatories (one is shown: 110). The lavatory 110 may include a sink 112, a toilet 114, and a sensor 116. The sensor 116 may sense/determine whether the lavatory 110 is occupied (e.g., by a passenger) or unoccupied. For example, the sensor 116 may be or include a motion sensor. The vehicle 100 may also include one or more kitchens or galleys (one is shown: 120). The kitchen 120 may include a sink 122, a dishwasher 124, and an ice maker 126. On one or more external surfaces or components of the vehicle 100, a self-healing anti-corrosive coating composition 128 may be applied to prevent or resist corrosion when exposed to a variety of harsh environmental conditions.

FIG. 2 illustrates a schematic view of a multilayered biopolymer and rare earth element coating on a substrate, in accordance with the present disclosure. A multilayered biopolymer and rare earth element coated article 200 having an anti-corrosive conversion coating is shown, with an aluminum substrate 202. Adjacent to the substrate is a first coating layer of a rare earth element (REE) 204. The first coating layer of a rare earth element (REE) 204 may be applied after a surface treatment, such as cleaning or abrasion, or a pre-coating with a suitable primer or adhesive. Onto the first coating layer of a rare earth element (REE) 204, a first coating layer of biopolymer 206 is disposed. In certain examples, a surface cleaning, primer, adhesive, or pretreatment can be used between the first coating layer of a rare earth element (REE) 204 and the first coating layer of biopolymer 206, or any other two alternating coating layers in accordance with the present disclosure. Onto the first coating layer of biopolymer 206, a second coating layer of rare earth element (REE) 208 is deposited, followed by a second coating layer of biopolymer 210, and a third coating layer of rare earth element (REE) 212. While FIG. 2 depicts a particular embodiment and arrangement of interspersed layers of rare earth element compound coating layers and biopolymer layers, other examples may have fewer or additional alternate layers of rare earth element compounds and biopolymers. For example, exemplary examples of a multilayered anti-corrosive conversion coating may include from 1 to about 5 layers of either rare earth element compounds or biopolymers upon a substrate. Illustrative examples of substrates include, aluminum, magnesium, a polymer composite, steel, stainless steel, alloys thereof, other commonly used surface metals, or a combination thereof. Rare earth element compounds may include compounds having a rare earth element. The rare earth elements (REE) include metallic elements which are part of the lanthanide series of the periodic table, and scandium (Sc) and yttrium (Yt). The lanthanide or lanthanoid series includes the elements lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and Lutetium (Lu). Rare earth elements and compounds thereof are considered as promising eco-friendly corrosion inhibitors. One mechanism of corrosion inhibition by REE for different materials is a consequence of blocking the cathodic areas on a substrate by precipitation of a film of rare earth element compounds including oxides or hydroxides, for example. The trivalent ions of rare earth elements in aqueous solution undergo progressive hydrolysis to form complex hydroxylated ions. Furthermore, in the presence of suitable additives, including, but not limited to titania ($TiO_2$), zirconia ($ZrO_2$), silica ($SiO_2$) silica based compounds, wetting agents, rare earth elements can exhibit self-healing properties when coated upon a substrate. Exemplary examples of rare earth element compounds of the present disclosure can include, but are not limited to, cerium phosphate, cerium oxide, cerium hydroxide, and other compounds including cerium. Lanthanoid oxides, hydroxides, and other mineral fillers thereof may be illustrative examples of rare earth element compounds for use in anti-corrosive conversion coating compositions of the present disclosure. In certain examples, rare earth element compounds can include compounds including phosphates, oxides, or hydroxides of scandium or yttrium. In a multilayered coating as shown in FIG. 2, each rare earth element layer thickness can be from about 3 µm to about 16 µm, from about 10 µm to about 15 µm, or from about 8 µm to about 15 µm, and each biopolymer layer thickness can be from about 4 µm to about 25 µm, from about 8 µm to about 16 µm, or from about 12 µm to about 22 µm.

Biopolymers of the present disclosure are also corrosion inhibitors in anti-corrosive conversion coating compositions. Biopolymers are naturally occurring polysaccharides existing as products of biochemical processes in living systems. Illustrative examples of biopolymers for use in anti-corrosive conversion coating formulations include starch, inulin, pullulan, dextran, chitosan, cellulose, lignin, pectin and the like. The adsorption of biopolymer molecules can take place in contact with anodic and cathodic sites of metal surfaces or substrates. This in turn increases in cathodic and anodic over voltage to form a protective oxide layer on the surfaces. Chitosan, typically utilized in coatings for alloys used in dental, orthopedic, and other implantable medical devices provides a biocompatible, corrosion resistant, self-repairing compound to anti-corrosive conversion coating compositions of the present disclosure. The Everest starch category includes exemplary biopolymers with a range of modified starches for imparting enhanced binding properties from a natural and cost-effective source. Dextran is another biopolymer showing enhancement of corrosion resistance in anti-corrosive conversion coating compositions. Biopolymers of the present disclosure also react with and become polydentate ligands for metal ion, and in particular rare earth elements or compounds thereof. The potential coordination sites of various biopolymers can form a coordination bond with the rare earth element ions. These complexes are rich in antioxidant properties and form a protective coating on aluminum and other metal and alloy surfaces through chemisorption. The combination of biopolymers and metal complexes in anti-corrosive coating compositions can serve to replace chrome or hexavalent chrome in anti-corrosive conversion coatings to improve the anti-corrosion performance and other coating characteristics for aerospace applications.

FIG. 3 illustrates a schematic view of a biopolymer doped with rare earth element coating on a substrate, in accordance with the present disclosure. The anti-corrosion conversion coating composition is shown as an article 300 coated with a biopolymer doped with rare earth element coating. The coated article includes a substrate 302, onto which a biopolymer doped with rare earth element coating layer 304 is deposited. The biopolymer-doped rare earth element coating layer 304 is representative of another exemplary example of anti-corrosion conversion coating compositions of the present disclosure, having a biopolymer dopant 306 dispersed within a rare earth element matrix 308. In certain examples, REE is doped in a biopolymer matrix, and the REE forms a complex with the biopolymer. In examples of multilayer coatings, there are alternate layers of REE and biopolymer. Coated articles in accordance with the present disclosure may include one or more substrate panels or components from a vehicle or other structure for use in harsh environments associated with aerospace environments, marine environments, and the like. The biopolymer can be present in the anti-corrosive conversion coating from about 0.5% wt to about 35% wt, from about 15% wt to about 25% wt, or from about 7% wt to about 25% wt, based on a total weight of the anti-corrosive conversion coating composition. The rare earth element can be present in the anti-corrosive conversion coating from about 0.5% wt to about 10% wt, from about 2% wt to about 5% wt, or from about 4% wt to about 7% wt, based on a total weight of the anti-corrosive conversion coating composition. In a single layer coating as shown in FIG. 3, each coating layer thickness can be from about 3 μm to about 25 μm, from about 4 μm to about 10 μm, or from about 8 μm to about 18 μm.

Other materials or additives can be used in the preparation of or in the formulation or composition of anti-corrosive conversion coating formulations of the present disclosure. These materials or additives can include silanes, organic solvents, functional additives such as visual indicators, wetting agents, anti-foaming agents, inorganic or mineral fillers, leveling agents, dispersants, thickeners, anti-foaming agents, or flow agents.

One or more silanes or organosilanes can be used in the anti-corrosive conversion coating composition to provide improved coating adhesion, either to the substrate, or to an adjacent layer in a multilayered coating structure. Silanes or organosilanes are generally understood to be, but not necessarily limited to, multifunctional silicon-containing molecules that include a reactive functional group and one or more hydrolysable alkoxy group. Illustrative silanes can include, but are not limited to, bis(trimethoxysilylethyl) benzene, bis(triethoxysilylethyl)benzene, aminopropyltrimethoxysilane, vinyl trimethoxysilane, allyl trimethoxysilane, or combinations thereof. Illustrative glycidoxy functional or epoxy functional silanes may include, but are not limited to, glycidoxypropyltrialkoxysilane (such as glycidoxypropyltrimethoxysilanes, 3-glycidoxypropyltrimethoxysilane, 3-glycidoxypropyltriethoxysilane, and the like), 3-(2,3-epoxypropoxypropyl)methyldiethoxysilane, 2-(3,4-epoxycyclohexyl)ethyltrimethoxysilane, 3-(2,3-epoxypropoxypropyl)methyldimethoxysilane, 2-(3,4-epoxycyclohexyl)ethylmethyldimethoxysilane, 8-glycidoxyoctyltrimethoxysilane, 1-(3-glycidoxypropyl)-1,1,3,3,3-pentaethoxy-1,3-disilapropane, and combinations thereof. Illustrative mercapto functional silanes may include, but are not limited to, 3-mercaptopropyltriethoxysilane, 3-mercaptopropyltrimethoxysilane, 11-mercaptoundecyltrimethoxysilane, s-(octanoyl)mercaptopropyltriethoxysilane, (mercaptomethyl)methyldiethoxysilane, 3-mercaptopropylmethyldimethoxysilane, mercaptopropyltrialkoxysilanes (such as mercaptopropyltrimethoxysilanes 3-Mercaptopropyltrimethoxysilane), mercaptoundecyltrimethoxysilane, (mercaptomethyl)methyldiethoxysilane, and combinations thereof. Illustrative silanes can include, but are not limited to, acrylic functional silanes such as 3-acryloxypropyltrimethoxysilane or 3-methacryloxypropyltrimethoxysilane.

The amount of the one or more organosilanes present in the anti-corrosive coating composition can be from about 0.1 weight % to about 10.0 weight %, based on a total weight of the anti-corrosive coating composition. For example, the amount of the one or more organic solvents present in the anti-corrosive coating compositions can be from about 1.0 weight %, about 2.5 weight %, about 5.0 weight %, or about 7.5 weight % to about 10.0 weight %, based on a total weight of the anti-corrosive conversion coating composition.

One or more organic solvents can be used in the anti-corrosive conversion coating composition which can be capable of or configured to disperse, solubilize, solvate, or otherwise dissolve one or more substances or components of the anti-corrosive conversion coating composition. The one or more organic solvents of the anti-corrosive conversion coating composition can also be capable of or configured to disperse, solubilize, solvate, or otherwise dissolve one or more substances, such as greases, oils, or debris, on surfaces contacted with the anti-corrosive conversion coating composition. For example, the one or more organic solvents of the anti-corrosive conversion coating composition can be capable of or configured to dissolve or disperse the one or more silanes, the one or more rare earth element compounds, the one or more biopolymers, the one or more functional additives, or combinations thereof.

The one or more organic solvents can be or include, but are not limited to, aliphatic hydrocarbons, aromatic compounds, such as aromatic hydrocarbons, halogenated hydrocarbons, nitrated hydrocarbons, ketones, amines, esters, alcohols, aldehydes, ethers, or the like, or combinations thereof.

Additional solvents present in the anti-corrosive conversion coating composition may include N-methyl-2-pyrrolidone (NMP), N-methyl-2-pyrrolidone, water, or combinations thereof.

Illustrative aliphatic hydrocarbon that can be utilized as the one or more organic solvents can be or include, but are not limited to, n-pentane, n-hexane, n-octane, n-nonane, n-decane, or homologues thereof, 2,2,4-trimethyl pentane, cyclohexane, or the like, or any combination thereof.

Illustrative aromatic compounds that can be utilized as the one or more organic solvents can be or include, but are not limited to, benzene, toluene, ethylbenzene, xylene, tetralin, hexafluoro xylene, or the like, or any combination thereof.

Illustrative halogenated hydrocarbons that can be utilized as the one or more organic solvents can be or include, but are not limited to, chloroform, methylene chloride, trichloro ethylene, dichloromethane, or the like, or combinations thereof.

Illustrative ketone organic solvents can be or include, but are not limited to, acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, n-methyl-2-pyrrolidone, diisobutyl ketone, acetophenone, or the like, or combinations thereof.

Illustrative esters that can be utilized as the one or more organic solvents can be or include, but are not limited to, methyl acetate, ethyl acetate, isopropyl acetate, n-butyl acetate, cellosolve acetate, or the like, or combinations thereof.

Illustrative alcohols that can be utilized as the one or more organic solvents can be or include, but are not limited to, methanol, ethanol, n-propanol, i-propanol, n-butanol, i-butanol, s-butanol, n-amyl alcohol, i-amyl alcohol, cyclohexanol, n-octanol, ethanediol, diethylene glycol, 1,2-propanediol, or the like, or combinations thereof.

Illustrative ethers that can be utilized as the one or more organic solvents can be or include, but are not limited to, diethyl ether, diisopropyl ether, dibutyl ether, methyl tert butyl ether, 1,4-dioxane, tetrahydrofuran, oligomers of perfluoropolyethers, such as the GALDEN® line, which is commercially available from Solvay of Houston, TX, or the like, or combinations thereof.

The amount of the one or more organic solvents present in the anti-corrosive conversion coating composition can be from about 75 weight % to about 99.5 weight %, based on a total weight of the anti-corrosive conversion coating composition. For example, the amount of the one or more organic solvents present in the anti-corrosive conversion coating composition can be from about 75 weight %, about 80 weight %, about 85 weight % or about 90 weight % to about 95 weight %, about 98 weight %, about 99 weight %, or about 99.5 weight %, based on a total weight of the anti-corrosive conversion coating composition. In another example, the amount of the one or more organic solvents present in the anti-corrosive conversion coating composition may be from about 75 weight % to about 99.5 weight %, about 80 weight % to about 99 weight %, about 85 weight % to about 95 weight %, or about 85 weight % to about 90 weight %, based on a total weight of the anti-corrosive conversion coating composition. In another example anti-corrosive conversion coating composition, the solvent can be present in an amount of from about 25 weight %, about 30 weight %, about 35 weight %, or about 40 weight %, based on a total weight of the anti-corrosive conversion coating composition. In another example, the solvent can be present in an amount of from about 25 weight % to about 40 weight %, about 25 weight % to about 30 weight %, or about 30 weight % to about 40 weight %.

The anti-corrosive conversion coating composition can include one or more optional functional additives capable of or configured to provide additional functional properties to the anti-corrosive conversion coating composition. These functional additives may include one or more of several visual indicators, wetting agents, anti-foaming agents, inorganic or mineral fillers, leveling agents, or any combination thereof. Examples of optional functional additives referred to herein are discussed further in turn below. The optional functional additives may be combined with the anti-corrosive conversion coating composition to add one or more functionalities alone or in combination with other additives for further functionalities.

The one or more indicators or visual indicators can be capable of or configured to facilitate, promote, or provide identification of an area or surface coated with the anti-corrosive conversion coating composition. For example, the visual indicators can be capable of or configured to allow a user to identify what surfaces or areas have been treated by the anti-corrosive conversion coating composition in varying environments (e.g., low light, confined space, etc.). The one or more indicators can be or include, but are not limited to, one or more dyes, pigments, ultraviolet (UV) indicators, or the like, or combinations thereof. The one or more indicators can be visible in the visible spectrum (wavelength of 380 nm to 700 nm), the UV spectrum (wavelength of 10 nm to 380 nm), or combinations thereof. The one or more indicators can absorb in the UV spectrum and emit in the visible spectrum. Said in another way, the visual indicator can absorb energy in the ultraviolet spectrum, and the visual indicator can emit energy in the visible spectrum. The one or more indicators can include one or more fluorescent compounds, phosphorescent compounds, or combinations thereof.

Illustrative indicators can be or include, but are not limited to, a proprietary blend of Chromate(2-), [4-[(5-chloro-2-hydroxy-3-nitrophenyl)azo]-2,4-dihydro-5-methyl-2-phenyl-3H-pyrazol-3-onato(2-)][3-[[1-(3-chlorophenyl)-4,5-dihydro-3-methyl-5-oxo-1H-pyrazol-4-yl]azo]-4-hydroxy-5-nitrobenzenesulfonato(3-)]-, disodium, 1-methoxy-2-propanol, 1,2-propanediol, and 2-methoxypropanol, a crimson red solvent based red liquid dye commercially available from KEDA™ Dye of Manitowoc, WI, Triple Glow Powder commercially available from GLONATION of Falmouth, KY, or the like, or combinations thereof.

The one or more indicators can be present in an amount of from about 0.01 weight % to about 5 weight %, based on a total weight of the anti-corrosive coating composition. For example, the one or more indicators can be present in an amount of from about 0.01 weight %, about 0.05 weight %, about 0.1 weight %, about 0.5 weight %, about 1 weight %, about 2 weight %, or about 2.5 weight % to about 3 weight %, about 3.5 weight %, about 4 weight %, about 4.5 weight %, or about 5 weight %, based on a total weight of the anti-corrosive coating composition. In another example, the one or more indicators can be present in an amount of from about 0.01 weight % to about 5 weight %, about 2 weight % to about 4 weight %, or about 3 weight % to about 3.5 weight %, based on a total weight of the anti-corrosive coating composition.

The anti-corrosive conversion coating composition can include one or more mineral or inorganic fillers. The one or more inorganic fillers can be capable of or configured to reinforce or modify the physical properties of the anti-corrosive conversion coating composition. Illustrative inorganic fillers of the anti-corrosive conversion coating composition can be or include, but are not limited to, silica or silicon dioxide, alumina, zirconia, hydrated alumina, silicates (e.g., zirconium silicate, aluminum silicate including calcined aluminum silicate), talc, sand, glass particles, aluminosilicates, barium sulfate, mica, diatomites, calcium carbonate, calcium sulfate, carbon, wollastonite, metaphosphate compounds, phosphate salts (e.g., insoluble phosphate salts), such as sodium metaphosphate, potassium metaphosphate, calcium pyrophosphate, magnesium orthophosphate, trimagnesium orthophosphate, tricalcium phosphate, dicalcium phosphate dihydrate, anhydrous dicalcium phosphate, calcium carbonate, magnesium carbonate, titanium dioxide, aluminum stearate or the like, or combinations thereof.

The one or more inorganic fillers can be present in an amount of from about 0.1 weight % to about 10 weight %, based on a total weight of the anti-corrosive conversion coating composition. For example, the one or more inorganic fillers can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the anti-corrosive coating composition. In another example, the one or more inorganic fillers can be present in an amount of from about 0.1 weight % to about 10 weight %, about 2 weight % to about 8 weight %, or about 4 weight % to about 6 weight %.

The anti-corrosive conversion coating composition can include one or more of an optional wetting agent, dispersant, leveling agent, flow agent, thickener, adhesion promoter, or anti-foaming agent. A wetting agent, dispersant, or leveling agent may also refer to a surfactant, or a surface-active molecule used to reduce the surface tension between one or more components of a coating formulation or dispersion, surface tension between a coating formulation and a surface or substrate to which it may be applied, or a combination thereof. Illustrative wetting agents, dispersants, or leveling agents of the anti-corrosive coating composition can be or include, but are not limited to, non-ionic ethoxylated alcohols, non-ionic surfactants such as sodium dodecyl sulfate (SDS), fluorinated surfactants, alkoxylate-functional surfactants, sulfosuccinate-functional surfactants, polyacrylic esters, or combinations thereof. Illustrative leveling agents such as, but not limited to polyvinylfluroide (PVF), polyvinylidene fluoride (PVDF), fluoroethylene vinyl ether (FEVE), or other fluorinated compounds or other fluorinated additives may be included. Illustrative flow agents, such as, but not limited to p-chloro benzotrifluoride, polyacrylates, and fluorinated polyacrylates may be used. Illustrative thickeners may include, but are not limited to alcohols such as ethanol, polyacrylic acid, polymethacrylic acid, polyvinylpyrrolidone, carboxyl, phosphate group compounds, alkoxylated alcoholic derivatives, and the like. An adhesion promoter may refer to a coating additive used to improve the formation of chemical or physical bonding of a coating formulation with a substrate or another coating layer. Illustrative adhesion promoters of the anti-corrosive coating composition can be or include, but are not limited to, organotitanates, zirconates, phosphates, silanes, hydroxylated compounds, or combinations thereof. An anti-foaming agent, defoamer, or foam control agent may refer to a coating additive used to reduce or hinder the formation of foam during mixing and handling of a coating formulation. Illustrative anti-foaming agents of the anti-corrosive coating composition can be or include, but are not limited to, silicones, oils, alcohols, stearates, glycols, silicone-based additives, insoluble oils, polydimethylsiloxanes and other silicones, stearates, glycols, or combinations thereof.

The one or more wetting agents, anti-foaming agents, adhesion promoters, or leveling agents can be present in an amount of from about 0.1 weight % to about 10 weight %, based on a total weight of the anti-corrosive conversion coating composition. For example, the one or more wetting agents, anti-foaming agents, or leveling agents can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the anti-corrosive conversion coating composition In another example, the one or more wetting agents, anti-foaming agents, or leveling agents can be present in an amount of from about 0.1 weight % to about 10 weight %, about 2 weight % to about 8 weight %, or about 4 weight % to about 6 weight %.

As used herein, "free" or "substantially free" of a material can refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−5% of a stated target value, maximum, or minimum value.

All references cited herein are hereby incorporated by reference in their entireties. In the event of a conflict in a definition in the present disclosure and that of a cited reference, the present disclosure controls.

METHODS

Preparation of anti-corrosive conversion coating compositions including biopolymer based coating formulations, rare earth element compounds, or biopolymers mixed with other resins and base polymers or functional additives can be completed by contacting a rare earth element compound in a solvent with a biopolymer in a solvent. Alternatively, the rare earth element compound solution and the biopolymer solution can be added to a solution or dispersion containing one or more functional additives. These ingredient can be stirred or mixed followed by one or more of the coating methods as described herein.

Figure 4:
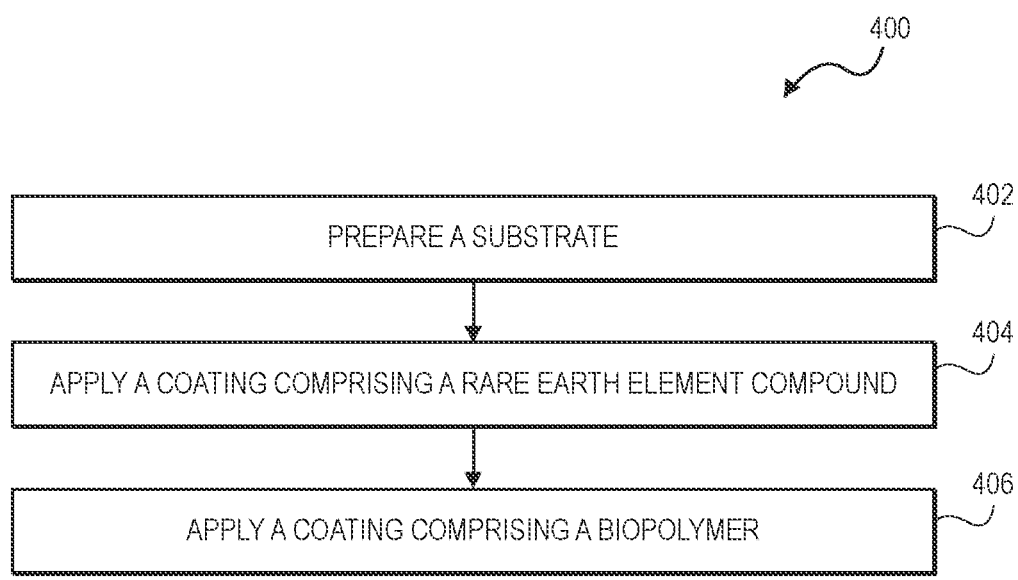
FIG. 4 is a flowchart illustrating a method of fabricating an anti-corrosive conversion coating composition, in accordance with the present disclosure.

FIG. 4 is a flowchart illustrating a method of fabricating an anti-corrosive conversion coating composition, in accordance with the present disclosure. The method for applying an anti-corrosive conversion coating composition 400 includes an initial step of preparing a substrate 402. Illustrative examples of substrates include, but are not limited to aluminum, magnesium, a polymer composite, steel, stainless steel, other commonly used surface metals, alloys thereof, or a combination thereof. Non-limiting examples of methods of substrate preparation can include abrasion, cleaning with solvents or detergents, wiping with solvents, applying a primer or adhesive, and the like. Next, the method for applying an anti-corrosive conversion coating composition 400 includes applying a coating including a rare earth element compound 404, followed by applying a coating including a biopolymer 406. In certain examples, the steps of applying a coating including a rare earth element compound 404 and applying a coating including a biopolymer 406 may be repeated, providing a multilayered anti-corrosive conversion coating having alternating layers including a rare earth element composition and a biopolymer, respectively. The method for applying an anti-corrosive conversion coating composition 400 may include applying the coating including a biopolymer after applying the coating including the rare earth element compound. In certain examples, the coating including the rare earth element compound may be applied after the coating including a biopolymer. In certain examples, the biopolymer includes chitosan, starch, inulin, dextran, pullulan, or a combination thereof, and the rare earth element compound includes cerium. Further examples of the method for applying an anti-corrosive conversion coating composition 400 may include the use of other coating compositions in accordance with the present disclosure. In certain examples, the biopolymer containing coating and the rare earth element containing compound may be combined into a single coating composition, in accordance with the present disclosure, and applied to a substrate as a single coating composition. Applications include vehicles or vehicle components in the marine, aerospace, automotive, or other industries.

It should be appreciated that the order of mixing or contacting each of the components of the anti-corrosive coating composition can be at least partially determined by the specific components selected. The method for applying the anti-corrosive conversion coating composition 400 may include pausing after applying the anti-corrosive conversion coating composition to allow the anti-corrosive conversion coating composition time to react with the surface, or to air dry, in effect, allowing any solvents present in the anti-corrosive conversion coating composition to dry or evaporate.

It should be noted that the step of allowing the drying of the anti-corrosive conversion coating composition may include drying at ambient conditions, which may be understood to mean temperatures between 50° F. and 100° F. and humidity levels between 0 and 95% relative humidity. The anti-corrosive conversion coating composition may then be allowed to dry over a time frame of approximately 1 min-60 min, or greater. In certain examples, heat curing may be conducted within temperature ranges of from about 40 to about 120° C., at times of from about 30 min to about 4 days. In still other examples, the anti-corrosive conversion coating composition may be cured under ambient conditions or room temperature from about 30 min to about 14 days, or using ultraviolet (UV) curing at any UV frequency, from about 30 min to about 1 day. This could prompt the inclusion of one or more photoinitiators, and optionally one or more crosslinkers to be components of the anti-corrosive conversion coating composition.

The method for applying the anti-corrosive conversion coating composition to coat or treat a surface can include applying or contacting the anti-corrosive conversion coating composition with the surface. The anti-corrosive conversion coating composition can be contacted with the surface via a brush, a roller, an extrusion gun, a spray gun, misting spray, wiping, either by wetting a wiper with a solution of coating or by applying with one or more pre-saturated wipers at a point of use, or the like, or any combination thereof. The anti-corrosive conversion coating composition disclosed herein may be capable of or configured to concurrently or simultaneously clean the surface, thereby requiring no mechanical processing of the substrate and effectively eliminating additional or optional steps in conventional methods of preparing the surface for the application of an anti-corrosive conversion coating composition. Alternatively, substrate cleaning with one or more solvents, surfactants, degreasers, or a combination thereof may be used to prepare the surface. The method for utilizing the anti-corrosive conversion coating composition to treat the surface can include evaporating the one or more solvents of the anti-corrosive conversion coating composition. The method can further include pausing after applying the anti-corrosive conversion coating composition to the substrate to allow the anti-corrosive conversion coating composition time to react with the substrate.

Non-limiting examples for uses of materials of the present disclosure comprise uses as anti-corrosive protective coating for metallic substrates, or other substrates susceptible to corrosion or corrosive elements based on one or more electrochemical mechanisms. For such substrates, materials of the present disclosure may be disposed on and/or in substrate materials composed of steel, stainless steel, aluminum, iron, magnesium, or alloys thereof, among others. An anti-corrosive coating composition may be disposed on a vehicle or vehicle component subject to service in a marine environment or other corrosive environment.

Additional deposition or coating application methods may include, but are not limited to, flow-coating, dipping, spraying, brush coating, spin coating, roll coating, doctor-blade coating, and mixtures thereof. Materials of the present disclosure are deposited to form a layer on a substrate, such as a layer on a surface of a vehicle component and/or vehicle surface, at a range of overall thicknesses, such as between about 0.1 μm and about 20 mm, such as between about 1 μm and about 15 μm, such as between about 1 μm and about 8 μm, such as between about 2 μm and about 6 μm. Material thickness can be utilized to tune conductivity and resistance of a deposited conversion coating material or to further tune other properties such as rain erosion or resistance to sand and hail damage of the material and resulting coated substrate and as such, may be as thick as 50 μm or 100 μm depending on the specific coating application.

After a material is sprayed, applied, or otherwise deposited onto a substrate, the material is heated or cured at any suitable temperature, e.g. to evaporate solvent. Curing may be performed using any suitable heating or curing apparatus. For curing, a temperature of the material may be raised gradually to a peak curing temperature at which the peak curing temperature remains constant for a period of time. A peak curing temperature may be between about room temperature and about 200° C., such as between about 70° C. and about 150° C. Materials may be cured for a period of time of between about 1 second and about 48 hours, such as between about 1 minute and about 10 hours.

Without wishing to be bound by any particular theory, it is thought that the biopolymers disclosed herein, such as, but not limited to starch, inulin, pullulan, dextran, and the like, contain electron rich heteroatoms such as oxygen, nitrogen, sulfur, etc., and participate in the formation of coordination bonding with rare earth elements (REE). The combination of biopolymers and rare earth ions can provide improved corrosion resistant coatings and a suitable alternative for chrome-based conversion coatings. These coatings can be provided via several methodologies in accordance with the present disclosure, such as applying multiple layer or bi-layered coatings while alternative coating layers of rare earth element ions and biopolymers, applying single layer, rare earth element containing biopolymer coatings. This may involve the formation of a bond onto a substrate through chemisorption. The biopolymer and rare earth element ions donate an electron to the vacant p-orbitals of aluminum or other metals to form a strong bond, thus providing surface adhesion of the coating to the substrate. The anti-corrosion conversion coatings utilizing a combination of biopolymer and rare earth metal complexes provides a potential replacement of chrome in such conversion coatings for marine and aerospace applications, among others. Such an approach may lead cost-effective, environmentally friendly, self-healing, and corrosion resistant conversion coatings.

The preceding description of various aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any examples or implementations disclosed herein. Accordingly, the disclosed range should be construed to have specifically disclosed all the possible subranges as well as individual numerical values within that range. As such, any value within the range can be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight of total solids. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that can be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A vehicle surface, comprising:
   a substrate comprising aluminum; and
   an anti-corrosive conversion coating composition, comprising:
   a first coating layer comprising a rare earth element compound disposed upon at least a portion of the substrate;
   a second coating layer comprising a biopolymer disposed upon at least a portion of the first coating layer;
   a third coating layer comprising a rare earth element disposed upon at least a portion of the second coating layer; and
   a fourth coating layer comprising a biopolymer disposed upon at least a portion of the third coating layer; and
   wherein:
   the biopolymer of the second coating layer or the fourth coating layer comprises inulin, dextran, pullulan, or a combination thereof.

2. The vehicle surface of claim 1, wherein the biopolymer of the second coating layer or the fourth coating layer further comprises chitosan.

3. The vehicle surface of claim 1, wherein the rare earth element compound of the first coating layer or the third coating layer comprises one or more of the lanthanide series of elements.

4. The vehicle surface of claim 1, wherein the rare earth element compound of the first coating layer or the third coating layer comprises scandium, yttrium, or a combination thereof.

5. The vehicle surface of claim 1, wherein the rare earth element compound of the first coating layer or the third coating layer comprises a hydroxide of a rare earth element, an oxide of a rare earth element, or a combination thereof.

6. The vehicle surface of claim 1, wherein the rare earth element compound of the first coating layer or the third coating layer comprises cerium.

7. The vehicle surface of claim 1, wherein the rare earth element compound of the first coating layer or the third coating layer comprises cerium oxide.

8. The vehicle surface of claim 1, wherein the rare earth element compound of the first coating layer or the third coating layer comprises cerium hydroxide.

9. The vehicle surface of claim 1, further comprising one or more mineral fillers, one or more reactive silanes, or a combination thereof.

10. A coated article, comprising:
    a substrate;
    a first coating layer comprising a rare earth element compound disposed upon at least a portion of the substrate;
    a second coating layer comprising a biopolymer disposed upon at least a portion of the first coating layer;
    a third coating layer comprising a rare earth element compound disposed upon at least a portion of the second coating layer; and
    a fourth coating layer comprising a biopolymer disposed upon at least a portion of the third coating layer; and
    wherein the rare earth element compound in the first coating layer and the rare earth element compound in the third coating layer are different.

11. The coated article of claim 10, wherein the biopolymer of the second coating layer or the fourth coating layer comprises chitosan, starch, inulin, dextran, pullulan, or a combination thereof.

12. The coated article of claim 10, wherein the rare earth element compound of the first coating layer or the third coating layer comprises one or more of the lanthanide series of elements.

13. The coated article of claim 10, wherein the biopolymer in the second coating layer and the biopolymer in the fourth coating layer are different.

14. The coated article of claim 10, wherein the rare earth element compound of the first coating layer or the third coating layer comprises cerium oxide and the biopolymer of the second coating layer or the fourth coating layer comprises starch.

15. A method for applying an anti-corrosive conversion coating composition, comprising: preparing a substrate; applying a first coating layer comprising a rare earth element compound upon at least a portion of the substrate; applying a second coating layer comprising a biopolymer upon at least a portion of the first coating layer; applying a third coating layer comprising a rare earth element compound upon at least a portion of the second coating layer; and applying a fourth coating layer comprising a biopolymer upon at least a portion of the third coating layer.

16. The method for applying an anti-corrosive conversion coating composition of claim 15, further comprising applying the second coating layer comprising a biopolymer after applying the first coating layer comprising the rare earth element compound.

17. The method for applying an anti-corrosive conversion coating composition of claim 15, wherein:
the substrate is aluminum;
the biopolymer of the second coating layer or the fourth coating layer comprises chitosan, starch, inulin, dextran, pullulan, or a combination thereof; and
the rare earth element compound of the first coating layer or the third coating layer comprises cerium.

18. The method for applying an anti-corrosive conversion coating composition of claim 15, wherein the rare earth element compound of the first coating layer or the third coating layer comprises cerium oxide and the biopolymer of the second coating layer or the fourth coating layer comprises starch.

19. The vehicle surface of claim 1, wherein the surface is a part of an airplane.

20. The coated article of claim 10, wherein the coated article is a part of an aerospace vehicle or an external surface thereof.

\* \* \* \* \*